United States Patent [19]

Buntrock et al.

[11] Patent Number: 5,022,920
[45] Date of Patent: Jun. 11, 1991

[54] METHOD AND COMPOSITION FOR INVESTMENT CASTING OF LAMINAR CERAMIC SHELL MOLDS

[75] Inventors: Kermit A. Buntrock, Chicago, Ill.;
Daniel R. English, Felton, Calif.;
Wescomb R. Jones, Wilmington, Del.

[73] Assignee: Buntrock Industries, Inc., Lively, Va.

[21] Appl. No.: 465,422

[22] Filed: Jan. 16, 1990

Related U.S. Application Data

[62] Division of Ser. No. 148,940, Jan. 27, 1988, Pat. No. 4,927,673.

[51] Int. Cl.$^5$ ................................................. B28B 7/34
[52] U.S. Cl. ..................................... 106/38.3; 106/38.9; 106/690
[58] Field of Search ...................... 106/38.9, 38.3, 690

[56] References Cited

U.S. PATENT DOCUMENTS

| | | | |
|---|---|---|---|
| 3,547,670 | 12/1970 | Fuchs et al. | 106/38.9 |
| 3,748,157 | 7/1973 | Moore | 106/38.9 |
| 3,752,689 | 8/1973 | Moore | 106/38.9 |
| 3,859,153 | 1/1975 | Beyer et al. | 106/38.9 |
| 3,860,476 | 1/1975 | Moore | 106/38.9 |
| 4,927,673 | 5/1990 | Buntrock et al. | 427/376.2 |

*Primary Examiner*—Mark L. Bell
*Assistant Examiner*—Deborah Jones
*Attorney, Agent, or Firm*—Allegretti & Witcoff, Ltd.

[57] ABSTRACT

A process for rapidly forming a laminar ceramic shell mold on a supporting structure comprising alternately, in either order, the steps of: (1) dipping the support structure into a bath comprising either an alkali stabilized solution of ionic silicate or an alkali stabilized solution of colloidal silica to define a first coating on the support structure; and (2) dipping the support structure into a bath comprising an acid stabilized solution of phosphate modified aluminum salt to define a second coating on the support structure. The coatings on the support structure react to form a gel set shell which can be fired to create a ceramic material. The dipping step sequence is repeated to provide additional coatings which react to define additional layers of gel set shell. The rate of laminate thickness buildup can be increased by including fine particulate refractory in the coating baths and the coated surface can be contacted by dry, relatively coarse refractory to define a stucco layer between the dip coatings. The chemically induced gel set eliminates the need for air drying between coating applications thereby saving a major portion of the total processing time. When the laminar refractory is formed around a disposable wax pattern of a desired metal shape it produces a strong ceramic shell mold that fully meets the requirements for the precision casting of metals.

13 Claims, 1 Drawing Sheet

METHOD AND COMPOSITION FOR INVESTMENT CASTING OF LAMINAR CERAMIC SHELL MOLDS

This is a divisional of application Ser. No. 148,940 filed Jan. 27, 1988, now U.S. Pat. No. 4,927,673.

BACKGROUND OF THE INVENTION

1. Field Of The Invention

This invention relates to improved methods and compositions for investment casting technology. The invention preferably involves improved phosphate modified aluminum salt binder compositions and their use in a process for forming quick setting refractory laminates. This process is particularly suited to the manufacture of expendable laminar ceramic shell molds for the investment casting of metal parts.

2. Description Of The Prior Art

Investment casting by the lost wax or cire perdu process is an old art that can be traced to ancient Egypt and China as early as 400 B.C. The process as practiced today, however, is a relatively new technology dating to the 1930's and represents a rapidly growing business and science. This technology simplifies the production of complex metal shapes by casting molten metal into expendable laminar ceramic shell molds formed around disposable wax patterns duplicating the desired metal shapes. The term "Investment Casting", derives from the Latin "investire" meaning to clothe, cover or surround and refers to the ceramic shell mold that is formed around the disposable wax pattern. "Precision Investment Casting", or PIC, is often the term preferred in the art to refer to the technology.

The conventional PIC process consists of six major steps:

(1) Pattern preparation—disposable positive patterns of the desired metal casting are made from thermoplastic materials (usually wax) that will melt, vaporize or burn completely so as not to leave contaminating residues in the de-waxed ceramic shell mold. The positive pattern is prepared by injecting the material into a negative, segmented, metal die or "tool" designed to produce patterns of the shape, dimension and surface finish required for the metal casting. Single or multiple patterns are then assembled by carefully fusing to a disposable wax "sprue system" that serves to properly feed molten metal to fill the shell mold;

(2) Investiture—the laminar shell mold construction consists of:

(a) dipping the wax pattern assembly in a slurry consisting of fine particulate refractory grain in an aqueous solution of alkali stabilized colloidal silica binder to define a coating of slurry on the pattern surface; and (b) contacting the slurry coating with coarse dry particulate refractory grain or "stucco" to define a stucco coating, followed by (c) carefully air drying to define an air dried insoluble gel bonded coating. These process steps are then repeated to build by successive coats a laminar shell mold of the desired thickness.

(3) Dewaxing—The disposable wax pattern assembly is removed from the "green" air dried shell by steam autoclaving, or by plunging into a flash de-waxing furnace heated to 1000°-1900° F. or other method for rapid heating to liquify the wax so that excessive pressure build-up does not crack the shell mold.

(4) Furnacing—The de-waxed shell mold is heated at a temperature of 1600°-2000° F. to remove volatile residues and form stable ceramic bonds by sintering. The furnaced shell mold temperature and heating cycles are carefully controlled to meet metal pouring requirements.

(5) Pouring—The pre-heated shell mold is recovered from the furnace and positioned for receiving the molten metal pour. The pour may be made in the air or vacuum chamber. The metal charge may be melted by gas, indirect arc, or induction heating. The castings may be poured statically or centrifugally and from a ladle or direct melting crucible.

(6) Casting recovery—The cast shell molds are broken apart and the metal castings are separated from the ceramic shell material. The casings are separated from the sprue system by sawing or cutting with abrasive disks. Castings are then cleaned by tumbling, shot or grit blasting.

Refractory Slurries

The slurries for preparing the shell molds are carefully controlled systems consisting of finely milled refractory grain and liquid binders. Different slurry compositions are typically used for building the prime (one or two) coats as compared to back-up coats.

Depending on the use temperatures of the mold and characteristics of the metal to be poured, different refractories are used. Typical refractories are kyanite, mullite, calcined china clay, alumina silicates, vitreous and crystalline silica, alumina, zircon and chromite ore.

Binders for these refractory slurries are critical components that effect both the shell building process and ultimate mold quality. Chemical stability is a prerequisite to obtaining long service from a slurry needed for repetitive dip applied coats. Binders must form insoluble gel bonds with the refractory grains when concentrated by air drying to permit redipping and wax pattern removal by steam autoclaving. The furnace stabilized ceramic bonds must also have adequate fired strength and refractoriness or resistance to fusion so as to withstand the molten metal pressure at high casting temperatures.

Hydrolyzed ethyl silicates and sodium stabilized colloidal silicas are the standard slurry binders that meet these criteria. The latter consist of alkaline aqueous dispersions of colloidal silica stabilized with sodium hydroxide, are non-flammable and has a low order of toxicity. The former is acid stabilized with sulfuric or hydrochloric acid added during the hydrolysis to form colloidal silica in situ and employs flammable and toxic alcohol solutions to maintain solubility. In spite of these shortcomings, ethyl silicate binders continue to be used to permit faster drying and lower levels of flux promoting sodium oxide.

In the conventional process for making shell molds, the interval required for drying between coats may vary from as little as 30 minutes for prime coats to 8 hours or more for back-up coats depending on mold complexity and shell wall thickness. Completed shells are usually air dried an additional 24 hours or more to assure adequate gel bond green strength needed for pattern removal. This dependence on air drying for shell mold quality accounts for a major portion of the processing time, contributes to high production costs and is a serious shortcoming.

Because of this shortcoming numerous efforts have been made to shorten or eliminate the interval required for drying between coats by using chemical methods for rapidly setting the slurry binder gel bond. Chemical gelation has also broadened the choice of slurry binder candidates beyond ethyl silicate and sodium stabilized colloidal silica to include ionic alkali metal silicate and acid stable alumina modified colloidal silica. These prior art processes are listed according to the method used to gel set the slurry binder system.

(1) One approach has been to use a gaseous gelling agent to gel set a slurry binder system. U.S. Pat. No. 2,829,060 teaches the use of carbon dioxide to gel set an ammonia modified sodium silicate slurry binder system. Jones, in a technical paper presented to the Investment Casting Institute in October of 1979, disclosed the use of carbon dioxide or acidic alumina solutions to set alkaline silicate binder slurries. U.S. Pat. No. 3,455,368 teaches the use of ammonia gas to gel set a hydrolyzed ethyl silicate or acidified colloidal silica binder system. U.S. Pat. No. 3,396,775 teaches the use of volatile organic bases to gel set a hydrolyzed ethyl silicate slurry binder system. Volatile gases present a ventilation problem that contributes to poor acceptance by the foundry.

(2) A second approach has been to use two interacting slurry binder systems to gel set one another when applied as alternating coats. U.S. Pat. No. 2,806,270 teaches the use of (1) a nitric acid acidified sodium silicate slurry to gel set an alkaline sodium silicate slurry; (2) a phosphoric acid acidified potassium silicate slurry system to gel set: (a) an alkaline potassium silicate slurry, (b) an alkaline piperidine modified ethyl silicate slurry, and (c) an alkaline mono-ethanolamine modified ethyl silicate slurry system; (3) an acidic ethyl silicate slurry to gel set: (a) an alkaline potassium silicate slurry, (b) an alkaline piperidine modified ethyl silicate slurry, and (c) an alkaline mono-ethanolamine modified ethyl silicate binder system. U.S. Pat. Nos. 3,751,276 and 3,878,034 teach the use of an acid stable alumina modified colloidal silica slurry binder system to gel set either an alkali stable ionic silicate binder slurry system or an alkali stabilized colloidal silica binder slurry system. The use of two interacting slurry binder systems is an efficient system that requires a minimum change in conventional shell making procedure. The two interacting slurry binder system is the approach used in the process of this invention and will be discussed in detail.

(3) A third approach uses a chemical treated stucco grain to gel set a binder slurry system. Dootz, Craig and Payton describe the use of mono-ammonium phosphate and magnesium oxide treated stucco to gel a sodium silicate binder slurry system. Reported in Journal Prosthetic Dentistry Vol. 17, No. 5, pages 464–471, May 1967.

(4) A fourth approach uses a gelling agent solution to gel set a binder slurry system. U.S. Pat. No. 3,748,157 teaches the use of a basic aluminum salt setting agent solution to gel set (1) a sodium stabilized negative sol colloidal silica binder slurry, and (2) an alkaline ionic silicate slurry binder system. In the prior art processes discussed above, Moore in U.S. Pat. No. 3,748,157 teaches the use of a basic aluminum salt setting agent solution to gel set (1) a sodium stabilized negative sol colloidal silica binder slurry and (2) an alkaline ionic silicate binder system. Moore teaches a specific class of basic aluminum salt and claims "said basic salt having the formula $Al_x(OH)_yA_z$, where $X=1-8$, $y=1-20$, and $x=1-4$. Moore uses "A" to denote an acid anion. The present invention differs from Moore in the following ways, none of which were taught or suggested by the prior art:

(1) This invention teaches the use of a binder rather than a salt. It also teaches a preferred method for converting an aluminum salt into a binder by the addition of phosphoric acid; this conversion method insures solubility within useful ranges and is both convenient and economical.

(2) Any soluble acidic aluminum salt can be used as the starting salt and need not contain hydroxyl groups.

(3) Two or more acid anions are present in the "converted" salt.

(4) Concentrations and ratios of phosphate to the soluble aluminum salt are defined and related to binder utility in both green and fired strength of the resultant shell molds.

(5) This invention makes possible the use of two interacting binder slurries so that each dip in the shell making process defines a gel bonded coating layer that is productive in binding shell thickness.

(6) Use of dry stucco between slurry coats with the double slurry process improves shell mold uniformity and eliminates excess water which must be removed and is detrimental to shell mold construction.

A prior commercialized attempt by the present inventors to overcome deficiencies in the prior art, such as Moore, U.S. Pat. No. 3,748,157, involved a technique in which the setting agent salt solution employed a combination of divalent and trivalent cations. The addition of the divalent salt was thought to substantially improve green strength when the setting salt was used to produce shell molds. The divalent salt could also be selected to promote fluxing to enhance ceramic bonding or promote devitrification and thus influence both hot strength of the mold during preheat and metal casting, as well as mold friability after cool down. Unfortunately, the use of an aqueous gelling agent was not efficient since it is an added dipping operation that does not add to shell thickness. It also adds excess water which is detrimental to shell construction and which must be removed. Despite some advantages, this system did not gain commercial acceptance and did not provide the advantages of the present invention outlined above and herein.

SUMMARY OF THE INVENTION

This invention is directed to a "quick-set" process for rapidly forming a laminar ceramic shell mold on a supporting structure, comprising in combination the steps of:

(a) preparing a first bath comprising either an alkali stabilized solution of ionic silicate or an alkali stabilized solution of colloidal silica;

(b) preparing a second bath comprising an acid stabilized solution of phosphate modified aluminum salt;

(c) dipping the support structure initially into one of the baths to define a first coating on the support structure; and (d) dipping the support structure thereafter into the other of the baths to define a second coating on the support structure; whereby the first and second coatings on the support structure react to form a gel set shell which can thereafter be fired to create a ceramic material. The steps (c) and (d) are repeated to provide additional coatings which react to define additional layers of gel set shell.

In a preferred embodiment, one bath comprises a slurry of particulate refractory dispersed in either an alkali stabilized solution of ionic silicate or an alkali stabilized solution of colloidal silica and the other bath comprises a slurry of particulate refractory dispersed in an acid stabilized solution of phosphate modified aluminum salt. This invention is also directed to a process wherein each slurry coating is contacted with a dry relatively coarse refractory grain or stucco to define a stucco coating so that the defined slurry coatings are interspaced by a reinforcing layer of stucco.

In a preferred form for the manufacture of expendable laminar shell molds for precision investment casting, a disposable pattern of the metal casting is first coated with one or more conventional air dried prime coats comprising in combination the steps of:

(1) preparing a first bath comprising a slurry of fine particulate refractory grain in an alkali stabilizing solution of colloidal silica or an acid stabilized solution of phosphate modified aluminum salt;

(2) preparing a second bath or pre-wet comprising a solution of alkali stabilized colloidal silica;

(3) dipping the support structure into the first bath to define a prime slurry coating on the support structure; and (4) contacting the prime slurry coating with dry particulate refractory grain to define a prime stucco coating; followed by (5) carefully air drying to define an insoluble gel bonded prime coating;

(6) dipping the prime coated support structure into the second bath to pre-wet the surface prior to either repeating steps 3 through 5 to define additional prime coating or proceeding with steps (c) and (d) to define quick-set back up coats as previously described. Preferably the first back up bath comprises a slurry of refractory grain dispersed in a solution of acid stabilized phosphate modified aluminum salt and the other dip comprises a slurry of refractory grain dispersed in either an alkali stabilized solution of ionic silicate or an alkali stabilized solution of colloidal silica. The coated pattern is stuccoed between each slurry dip with coarse refractory grain.

This invention also includes the manufacture of expendable shell molds in which the disposable pattern is prime coated by dipping directly into the first quick-set bath so that the total laminar shell is constructed without drying between coats as previously described.

Laminar Ceramic Shell Mold

This invention also includes laminar ceramic shell molds made by the process as previously discussed. The shell molds comprise multiple layers of ceramic material which include a monovalent metal oxide, silica, alumina and phosphorous pentoxide. The ceramic material defines a binder material around particulate refractory material comprising one or more materials selected from the group consisting of kyanite, mullite, calcined china clay, alumina silicate, vitreous and crystalline silica, alumina, zircon and chromite ore.

The process of this invention offers a number of advantages for the manufacture of refractory shell molds over the above described prior art processes. In addition to the advantages previously described, this process eliminates the need for drying between back-up coats and reduces the time required for final drying before autoclave de-waxing.

Another advantage of this process is that the quick setting back-up coats can be applied to a conventional air dried prime coated pattern to maintain the desired metal casting shape, dimension and surface characteristics without need to modify the existing pattern tooling. The binder refractory slurry systems of this process can accommodate a wide range of required shell mold thermo-expansions.

Another advantage of this invention is the use of alternating acid stable ionic alumina and alkali stable ionic silicate binder slurry systems to give higher green gel strength due to greater chemical reactivity of true solutions versus colloidal suspensions. These slurry systems also give a wide range of fired strength and refractoriness control due to the wide melting point range of sodium silicate at 1850° F. to alumina at 3650° F. These properties are used in engineering a specific refractory shell mold system to suit the expansion factor built into existing pattern tooling.

Another advantage of the process of this invention is to build shell molds using an all alumina prime coat made from a slurry with alumina refractory dispersed in the phosphate modified aluminum salt binder so as to avoid unwanted reactive silica in the shell mold face coat.

DESCRIPTION OF THE PREFERRED INVENTION

Figure 1:
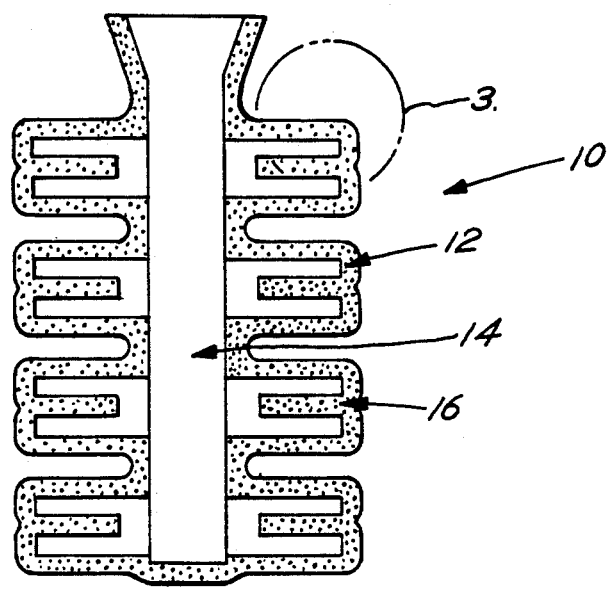
FIG. 1 illustrates a cross-sectional view of a typical ceramic shell mold construction formed around a cluster of disposable patterns attached to a single sprue.

In FIG. 1 of the drawing, the invention 10 comprises a positive disposable pattern 12 of the desired metal casting, a disposable "sprue" 14 or system for delivering molten metal to fill the mold cavity, and a laminar ceramic coating 16 or shell mold that will contain the molten metal defining a metal casting. A major advantage of the shell mold 16 is its light weight compared to other methods for casting metal. A typical shell mold is only 10–20% as heavy as a sand mold and does not require additional support to retain the molten metal. The shell mold 16 has laminar construction and close configuration to the desired casting shape and size. The shell mold 16 also offers other advantages over casting processes that are discussed throughout this specification.

Figure 2:
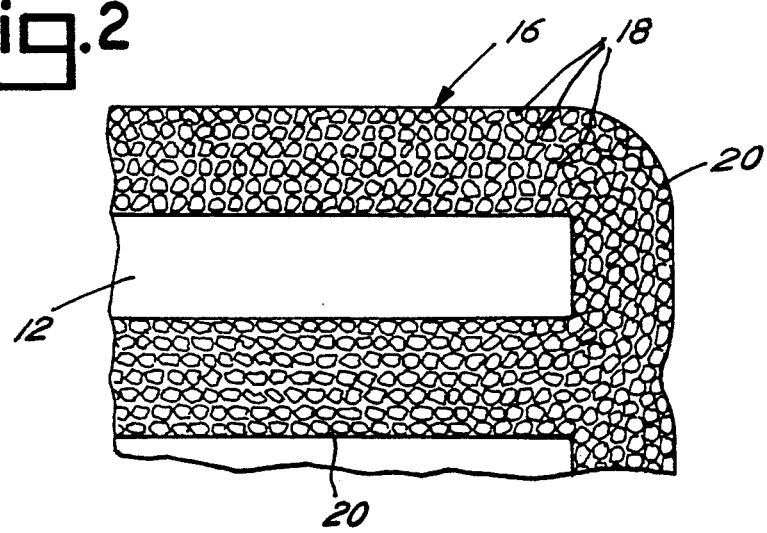
FIG. 2 illustrates in cross-sectional view the composition detail of a shell made according to the present invention.

FIG. 2 illustrates an expanded cross-sectional view of the positive pattern 12 and shell mold construction 16, with particular emphasis on the details of the shell mold 16 composition. As shown in FIG. 2, the shell mold 16 preferably comprises layers of relatively coarse particulate refractory, i.e., stucco, 18 surrounded by ceramic material 20. The ceramic material 20 is formed according to the methods and compositions disclosed herein.

Figure 3:
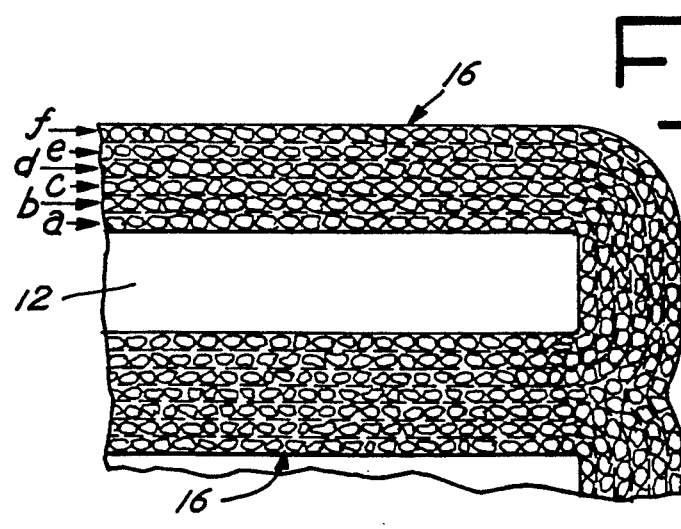
FIG. 3 is another view of the shell shown in FIG. 2, but illustrating in cross-sectional view the laminar construction detail of the successive refractory slurry and stucco coatings that comprises the ceramic shell mold.

FIG. 3 further illustrates the details of laminar construction of the shell mold 16 in FIG. 2. That is, FIG. 3 illustrates that the shell mold 16 is comprised of six (6) successively applied shell mold layers. These six layers are designated a, b, c, d, e, f, respectively. The following Table 1 lists the sequence of steps that were preferably used to prepare each of the shell mold layers, a, b, c, etc. The manner of sequentially applying the steps will become more clear in the following description.

TABLE 1

| | Process/Composition For Shell Mold Type A-2 | | | | | |
|---|---|---|---|---|---|---|
| Coating No. | A | B | C | D | E | F |
| Pre-Wet/ Seal Dip | — | Col. | — | — | — | — |
| Drain | — | Drain | — | — | — | — |
| Slurry Dip | Col. | Blue[1] | Red[1] | Blue | Red | Blue |
| Drain | Drain | Drain | Drain | Drain | Drain | Drain |
| Stucco | FS-70 | FS-30 | FS-30 | FS-30 | FS-30 | — |
| Hold/Dry | Dry | Hold | Hold | Hold | Hold | Dry |

[1]The reference to Blue and Red refers to Bluonic and Redonic premade compositions of Buntrock Industries, Inc., which will be more fully explained shortly.

The Type A-2 shell mold comprises a conventional air dried prime slurry coat stuccoed with 70 mesh fused silica, four quick-set back-up slurry coats stuccoed with 30 mesh fused silica and a bluonic quick-set "seal coat" applied without stucco. The shell mold composition was outlined above.

The invention will now be described with particular reference to the use of superior gel forming ionic binders in forming compositioned laminar refractory shell molds engineered to meet investment casting requirements.

Alkali Stable Binder Solutions

The alkaline ionic silicates are preferred for the process of this invention. Sodium silicate and potassium silicate are produced economically in large commercial volume as water solutions having molar ratios $SiO_2$:($Na_2O$ or $K_2O$) of 2:1 to 4:1. Preferred ratios range from 2.5 to 3.5. More specifically this invention embodies the use of commercially available 3.22 to 3.24:1 weight ratio sodium silicate. The total concentration of the oxide solids $SiO_2$ and $Na_2O$ in water solution, may range from 12-30% by weight, with utility restricted beyond these limits. Concentrations higher than 30%, by weight, cause a decrease in strength and shell mold failure. The preferred range for this invention is sols containing 16 to 28% total oxide solids by weight.

Lithium silicates are commercially available as aqueous dispersions of polysilicate stabilized with lithium hydroxide. They have a molar ratio of $SiO_2$:$Li_2O$ ranging from 4.8:1 to about 8.5:1. The lithium polysilicates have characteristics of both colloidal and ionic silicates. The lithium polysilicate dispersions are suitable for the process of this invention but do not offer the economic advantages of the other available ionic silicates.

The alkali stable colloidal silica sols are also suitable for the process of this invention. The commercially available sodium silica sols have a $SiO_2$:$Na_2O_2$ ratio from 50:1 to 300:1, particle size range from 5 nm to 50 nm, silica solids concentration from 15 to 50% $SiO_2$, by weight and sodium oxide concentration from 0.10 to 0.60% $Na_2O$, by weight. The preferred colloidal silica sols and optimum concentration for use in both the conventional air dry process for gelation and the chemical quick-set process of this invention are shown in the following Table 2:

TABLE 2

| Commodity | A | B | C |
|---|---|---|---|
| Particle size nm | 7–8 | 13–14 | 22–25 |
| Silica $SiO_2$ wt. % | 30.0 | 30.0 | 49.0 |
| Alkalies $Na_2O$ wt. % | 0.60 | 0.32 | 0.21 |
| $SiO_2$/$Na_2O$ wt. ratio | 50:1 | 93:1 | 230:1 |
| Optimum Use $SiO_2$ % | 22–25 | 27–30 | 30–33 |
| Gel Point $SiO_2$ % | 57 | 62 | 67 |

The choice of colloidal silica product grade is usually based on particle size and ratio of $SiO_2$:$Na_2O$. The smaller particle size colloidal silica grades require a higher level of stabilizing alkali but are more efficient binders and can be used at lower solids concentration. The larger size colloidal silica grades are less efficient binders, but are used when lower levels of alkali are required to improve refractoriness.

Acid Stable Binder Solution

In the process of this invention a disposable pattern is alternately dipped into a bath comprising alkali stabilized ionic silicate or alkali stabilized sol of colloidal silica, as described, and a bath comprising an acid stabilized solution of phosphate modified aluminum salt of this invention.

The acid stabilized phosphate modified aluminum salt composition of this invention can be represented by the molar ratio of the critical components expressed as oxides and the molar acid hydrogen equivalent range used to maintain alumina solubility as follows:

(a) Ratio of $P_2O_5$:$Al_2O_3$ = Between about 1:2 and about 1:9, and
(b) Ratio of $Al_2O_3$:Acid hydrogen equivalent = Between about 1:1 and about 1:6.

The acid anion is selected from the group consisting of chloride, sulfate, nitrate, acetate and formate. Molar ratios of $P_2O_5$:$Al_2O_3$ beyond the limits of about 1:(2-9) have restricted utility. Ratios lower than about 1:2 give low melting points and poor fired strength. Ratios higher than about 1:9 give weak gel bond strength and low green strength. The pre-fired oxide mole ratio of this invention is about $1P_2O_5$:$6Al_2O_3$ and based on suitable soluble alumina sources would have a molecular proportion of critical oxides of about $1P_2O_5$:$6Al_2O_3$ and (6-36) moles of acid hydrogen equivalent.

The following soluble aluminum salts are commercially available and suitable for the process of this invention.

TABLE 3

| Suitable Soluble Aluminum Salt | Preferred Composition |
|---|---|
| Aluminum Chloride = $AlCl_3$ | $P_2O_5$:$6Al_2O_3$, 36 HCl |
| Aluminum Hydroxychloride = $Al(OH)_2Cl$ | $P_2O_5$:$6Al_2O_3$, 12 HCl |
| Aluminum Chlorohydrol = $Al_2(OH)_5Cl$ | $P_2O_5$:$6Al_2O_3$, 6 HCl |
| Aluminum Nitrate = $Al(NO_3)_3$ | $P_2O_5$:$6Al_2O_3$, 36 $HNO_3$ |
| Aluminum Sulfate = $Al_2(SO_4)_3$ | $P_2O_5$:$6Al_2O_3$, 18 $H_2SO_4$ |
| Aluminum Hydroxy Acetate = $Al(OH)(O_2C-CH_3)_2$ | $P_2O_5$:$6Al_2O_3$, 24 $HO_2C-CH_3$ |
| Aluminum Hydroxy Formate = $Al(OH)(O_2CH)_2$ | $P_2O_5$:$6Al_2O_3$, 24 $HO_2CH$ |

Aluminum chloride and aluminum sulfate are preferred for economic reasons since they are produced as large volume commerical products. More preferred, however, is aluminum chlorohydrol since it is the source of the highest soluble alumina content at 23.5% $Al_2O_3$ and it produces the preferred acid stabilized phosphate modified aluminum salt $P_2O_5{:}6Al_2O_3$, $6HCl$ composition that has the lowest level of volatile acid residue.

Concentration of the phosphate modified aluminum salt aqueous solution may range from about 10–25%, by weight, of total oxide ($Al_2O_3+P_2O_5$) with utility restricted beyond these limits. Oxide concentrations higher than about 25% result in excessive slurry viscosity, and oxide concentrations less than about 10% result in decreased gel bond strength. The preferred range for binder solution concentration is about 12–16% total oxide.

Phosphate Modified Aluminum Salt Binder

This invention also includes the process of producing a phosphate modified aluminum salt by the careful addition and reaction of phosphoric acid solutions with a suitable soluble alumina salt, as described above, to give a binder solution of the desired $P_2O_5{:}Al_2O_3$ mole ratio and total oxide concentration.

EXAMPLE 1

A phosphate modified aluminum salt solution is made by reacting commerical 80% phosphoric acid containing 61.6% $P_2O_5$, by weight, with "chlorohydrol" a 50% solution of the formula $Al_2(OH)_5$ $Cl \cdot 2\frac{1}{2}$ $H_2O$ containing 23.5% $Al_2O_3$, by weight, and 8.15% Cl, by weight, to give a preferred solution having the composition of 15% total oxide, by weight, and mole ratio of about $1P_2O_5{:}6Al_2O_3$, $6HCl$ is prepared as follows:

295 lbs. of "chlorohydrol" 50% solution is placed in a suitable agitated acid resistant mixing container (plastic or stainless steel) that will comfortably hold 50 gallons. The solution is diluted with 100 lbs. of water and 23.0 lbs. of 85% phosphoric acid is added with thorough agitation to permit cooling. A final 82 lbs. of water is added to bring the final solution weight to 500 lbs. The completed solution is mildly acidic pH 3.0–3.5, specific gravity 1.185–1.190 and viscosity 3–5 cps at 25° C.

The phosphoric acid addition has a marked effect on the chemical and physical properties of the unmodified soluble aluminum salt solutions that enables their satisfactory use as slurry binders versus their use as gelling agents described in U.S. Pat. No. 3,748,157 and as surface modifiers for inorganic colloids as described in U.S. Pat. No. 3,007,878.

Several significant points distinguish the phosphate modified aluminum salt solutions of this invention from prior unmodified aluminum salt solutions:

1. The phosphate modified aluminum salt solutions exhibit increased cohesiveness versus the unmodified soluble aluminum salts. Surfaces wetted by the solution retain a thin continuous film that is "tacky" to touch and is an effective adhesive for joining absorbent surfaces. The unmodified "chlorohydrol" used by the prior art is an important ingredient in cosmetic underarm deodorants and does not exhibit significant "tack".

2. When neutralized with 1 normal sodium hydroxide the phosphate modified aluminum salt solutions form stiff coherent gels at about pH 4.5 whereas the unmodified soluble aluminum salt solutions form soft flocculent gels at about pH 6.0. Both modified and unmodified solutions, however, form insoluble gels when reacted with either alkali stabilized colloidal silica or alkali stabilized ionic silicate solutions.

3. Refractory slurries made by dispersing fine particulate refractory grain in phosphate modified aluminum salt solution form a tightly adhering air dried coating on pattern wax suitable for a shell mold prime coating. A similar coating made with unmodified soluble aluminum salt does not have good adhesion to the pattern wax and is not suitable for use as a shell mold prime coating.

Refractory Grains

A wide range of refractory grains are suitable for the practice of the invention including all of the standard materials used for shell building as kyanite, mullite, calcined china clay and other alumina silicates, vitreous and crystalline silica, alumina, zircon and chromite ores. In general suitable refractories should be free from ionic contaminates that can contribute to slurry instability and should also be stable to thermally induced phase change that can occur at critical stages of the casting process. The choice of refractory type and grade is usually based on melting point and particle size. Prime slurries employ the finest sizes of refractory grain normally 100 mesh and finer, down to a minimum 325 mesh. Back-up slurries employ coarser grain sizes, normally in the range of 80–150 mesh. The refractory grains used as stucco are the coarsest materials with prime stucco normally between 50 and 100 mesh and back-up stucco ranging between 20 to 50 mesh.

Refractory Slurries

The quick-set process requires at least three refractory slurries, one for the application of prime coats made with alkali stabilized colloidal silica or acid stabilized phosphate modified aluminum salt and two for the alternating application of quick-set coats of which one is made with acid stabilized phosphate modified aluminum salt and the other with alkali stabilized colloidal silica or ionic silicate. In general, the slurry compositions are simple mixtures of liquid binder and refractory grain to give an optimum slurry viscosity for the shell dipping process. The slurry composition is expressed as the weight ratio of (binder solution:refractory grain). Example: 70 lbs. of liquid binder:100 lbs. refractory grain gives a weight ratio expressed as (0.70 $R_w$).

Slurry Composition

The slurry compositions are determined by the shell mold characteristics needed to produce a desired metal casting shape, dimension, and surface finish from a carefully designed disposable wax pattern. The patterns are produced by injection molding technique using precision dies or "tooling" engineered to meet the above requirements. The composition of the two quick-set slurries is derived from the prime coat slurry to give a shell mold type that when combined with proper shell construction enables a successful transition from "air-dry" to "quick-set" without need to change pattern tooling.

The following are slurry formulations designed to produce important shell mold types. Optimum binders designated for use in the slurry formulations are:

(1) Alkali stabilized colloidal silica used at 22% $SiO_2$.

(2) "Bluonic binder"—acid stabilized phosphate modified aluminum salt ($P_2O_5{:}6Al_2O_3$, $6HCl$) used at 15% total oxide.

(3) "Redonic binder"—alkali stabilized ionic silicate (3.25$SiO_2{:}Na_2O$) used at 27% total oxide.

The quick-set binder solutions are dyed blue and red, to avoid inadvertent mixing and gelation during common use.

The possible variations in shell mold composition are nearly limitless. However, the following Tables 4–8 describe the compositions used for making various typical shell molds possessing frequently needed qualities:

TABLE 4

SHELL MOLD TYPE A-1
All fused silica prime, low density, low expansion back-up. Recommended for easy spent shell removal.

| Slurry Materials | Colloidal Prime | Bluonic Back-Up | Redonic Back-Up |
|---|---|---|---|
| Colloidal Binder | 30 | | |
| Bluonic Binder | | 65 | |
| Redonic Binder | | | 80 |
| Fused Silica 200F/120F | 100 | 70 | 70 |
| Alumina Silicate | | 15 | 15 |
| Zircon 325 mesh | | 15 | 15 |
| TOTAL Refractory | 100 | 100 | 100 |
| $R_w$ Binder/Refractory | .30 | .65 | .80 |
| Viscosity - Zahn | 30 sec. No. 5 | 8–12 sec. No. 4 | 8–12 sec. No. 4 |
| Density - grams/cc | 1.92 | 1.76 | 1.75 |
| STUCCO TYPE | Fused Silica-50 | Fused Silica-30 | Fused Silica-30 |

TABLE 5

SHELL MOLD TYPE B-1
All zircon prime, high density, high refractoriness, low expansion.

| Slurry Materials | Colloidal Prime | Bluonic Back-Up | Redonic Back-Up |
|---|---|---|---|
| Colloidal Binder | 26 | | |
| Bluonic Binder | | 50 | |
| Redonic Binder | | | 65 |
| Fused Silica 120F | | 33 | 33 |
| Alumina Silicate 200 | | 33 | 33 |
| Zircon 325 mesh | 100 | 33 | 33 |
| TOTAL Refractory | 100 | 100 | 100 |
| $R_w$ Binder/Refractory | .26 | .50 | .65 |
| Viscosity - Zahn | 12 sec. No. 5 | 8–12 sec. No. 4 | 8–12 sec. No. 4 |
| Density - grams/cc | 3.77 | 1.98 | 1.93 |
| STUCCO TYPE | Zircon-80 | Fused Silica-30 | Fused Silica-30 |

TABLE 6

SHELL MOLD TYPE C-1
Zircon prime, alumina silica back-up. High density, high refractoriness, medium expansion.

| Slurry Materials | Colloidal Prime | Bluonic Back-Up | Redonic Back-Up |
|---|---|---|---|
| Colloidal Binder | 26 | | |
| Bluonic Binder | | 55 | |
| Redonic Binder | | | 70 |
| Fused Silica 200F | | | |
| Alumina Silicate 200 | | 100 | 100 |
| Zircon 325 mesh | 100 | | |
| TOTAL Refractory | 100 | 100 | 100 |
| $R_w$ Binder/Refractory | .26 | .55 | .70 |
| Viscosity - Zahn | 12 sec. No. 5 | 8–12 sec. No. 4 | 8–12 sec. No. 4 |
| Density - grams/cc | 3.77 | 1.90 | 1.82 |
| STUCCO TYPE | R-80, Al-S 60 | Al-S 22 | Al-S 22 |

TABLE 7

SHELL MOLD TYPE D-1
Quartz/Colloidal prime. High expansion, easy shell removal. Replacement for ethyl silicate prime and back-up used with quartz refractory grain.

| Slurry Materials | Ethyl Silicate Prime | Bluonic Back-Up | Redonic Back-Up |
|---|---|---|---|
| Colloidal Binder (1)* | 30 | | |
| Bluonic Binder | | 60 | |
| Redonic Binder | | | 75 |
| Fused Silica | | | |
| Alumina Silicate | | 10 | 10 |
| Quartz 325 | 100 | 90 | 90 |
| TOTAL Refractory | 100 | 100 | 100 |
| $R_w$ Binder/Refractory | .30 | .60 | .75 |
| Viscosity - Zahn | 20–30 sec. No. 5 | 8–12 sec. No. 4 | 8–12 sec. No. 4 |
| Density - grams/cc | 2.07 | 1.85 | 1.83 |
| STUCCO TYPE | Quartz 70 mesh | Quartz 30 mesh | Quartz 30 mesh |

(1)*Low sodium stabilized colloidal silica used at 30% $SiO_2$.

TABLE 8

SHELL MOLD TYPE E-1
Tabular alumina, bluonic prime. High density, high refractoriness, medium expansion, low metal reactivity.

| Slurry Materials | Bluonic Prime | Bluonic Back-Up | Redonic Back-Up |
|---|---|---|---|
| Bluonic Binder | 30 | 45 | |
| Redonic Binder | | | 60 |
| Fused Silica | | | |
| Alumina Silicate | | | |
| Zircon | | | |
| Alumina 325 | 100 | 100 | 100 |
| TOTAL Refractory | 100 | 100 | 100 |
| $R_w$ Binder/Refractory | 0.3 | 0.45 | 0.6 |
| Viscosity - Zahn | 15 sec. No. 5 | 8–12 sec. No. 4 | 8–12 sec. No. 4 |
| Density - grams/cc | 2.51 | 2.29 | 2.13 |
| STUCCO TYPE | Tabular Alumina | Tabular Alumina | Tabular Alumina |

Mixing Procedures

Quick-set slurries are prepared by placing the liquid binder in a clean, water rinsed mixing tank. The refractory flour is then added in increments that can be handled effectively by the mixer until an acceptable viscosity is reached (8–12 seconds No. 4 Zahn). After thorough mixing to remove entrapped air and to reach slurry equilibrium, a final viscosity adjustment is made by the addition of binder or refractory flour. Non-ionic wetting agent up to 0.05% based on binder can be added.

Colloidal silica slurries are prepared by adding the appropriate amount of commodity alkali stabilized colloidal silica and then diluting with water to the optimum silica solids as previously discussed. The refractory flour is then added as above. The slurry is allowed to mix for 24 hours to reach equilibrium and remove entrapped air. The viscosity is then checked and adjusted with either flour or binder. Non ionic wetting agent up to 0.05% based on binder weight can be added.

Operating Control

Quick-set slurries have good chemical stability allowing viscosity to be a major control point. Once the optimum slurry viscosity is established, control points are set up to monitor the slurry operation as follows:

1. Accurately determine the relationship between optimum viscosity and $R_w$ (ratio of binder weight divided by refractory flour weight).

2. Accurately determine the slurry density at optimum viscosity by weighing a measured volume of slurry in a tared 100 ml. graduate and calculate grams per c.c. Establish as a slurry control point. The viscosity of a working slurry maintained at a constant $R_w$ will increase along with density reflecting water loss to evaporation. Water replacement should restore both viscosity and density to established control values. A slurry control chart plotting density, viscosity and $R_w$ along with a notation of all binder, refractory flour and water additions should be maintained to keep track of the ongoing composition.

Slurry Properties

"Quick-set" slurries should be operated at a low viscosity range (8-12 seconds, No. 4 Zahn) to obtain drainage of unreacted slurry from the pattern prior to stuccoing. Chemical gel-set interaction of oppositely charged slurries effectively controls the wet slurry pick-up. Properly drained slurry coats provide an ideal, tacky, receptive surface for stucco to further assure shell coating uniformity.

Quick-set slurries are chemically stable and have a long, indefinite service life when maintained under reasonable operating control of evaporation loss and cross contamination due to excessive dripping. Unreacted slurry deposit buildup is water soluble and easily cleaned up or recovered. Excellent slurry refractory suspension enables mixer restart after extended periods of shutdown.

Alkali stable colloidal silica slurries are chemically stable and have a long service life when maintained under reasonable operating control of evaporation loss and cross-contamination. The slurry deposit buildup is not water soluble. Buildup can be lessened by controlling solution splash. Deposits can be removed by chipping or wire brushing. Agitation must be maintained to keep slurries in suspension.

Shell Mold Construction

The shell mold construction details vary with mold requirements and are outlined in a construction plan for each shell mold type. The construction plan for a Type A-1 shell mold begins with the application of two conventional air-dried colloidal silica prime coats applied to a disposable wax assembly, pre-cleaned in a Freon solvent bath, as outlined in the following Table 9:

TABLE 9

| Coating No. | 1 | 2 | 3 | 4 | 5 | 6 | 7 | 8 |
|---|---|---|---|---|---|---|---|---|
| SHELL MOLD TYPE A-1 | | | | | | | | |
| Pre Wet/Seal Dip | — | Col* | Col | — | — | — | — | Col |
| Drain | — | Drain | Drain | — | — | — | — | Drain |
| Slurry Dip | Col | Col | Blue | Red | Blue | Red | Blue | — |
| Drain | Drain | Drain | Drain | Drain | Drain | Drain | Drain | — |
| Stucco | FS-70 | FS-70 | FS-30 | FS-30 | FS-30 | FS-30 | — | — |
| Hold/Dry | Dry | Dry | Hold | Hold | Hold | Hold | Hold | Dry |

*"Col" refers to a colloidal primer.

The pre-cleaned pattern is dipped into prime slurry A-1 to coat the surface with a continuous layer of slurry, drained thoroughly to remove excess slurry and then stuccoed with 70 mesh fused silica refractory grain by passing the pattern through a rainfall of the dry stucco grain to coat the pattern. The pattern is then placed in a rack to dry for 1 to 1½ hours to define an insoluble gel bonded prime coating. The dry prime coated pattern is pre-wetted by dipping into a bath of colloidal silica binder, thoroughly drained, re-dipped into the prime slurry, thoroughly drained to remove excess slurry, stuccoed by dipping into a fluid bed of 70 mesh fused silica grain, and racked to dry for 2 to 3½ hours to define a second insoluble gel bonded coating. The dry prime coated pattern is pre-wetted in colloidal silica binder, drained, dipped into the A-1 Bluonic slurry, thoroughly drained to remove excess slurry, and stuccoed by dipping into a fluid bed of 30 mesh fused silica grain to complete the first quick-set back-up coating. The wet reactive shell can be immediately dipped into the A-1 Redonic slurry to gel set the preceding quick-set coating, then thoroughly drained to remove excess slurry, and stuccoed in a fluid bed of 30 mesh fused silica grain to complete the second back-up coating. The quick-set back-up coats can be applied as rapidly as dipping, drainage and stuccoing permit or the interval between coats can be extended as long as the coating remains moist and reactive. Alternating back-up coatings are applied until the desired shell thickness is obtained. When the shell mold construction reaches the final slurry dip, the shell is drained thoroughly and the stucco coating is omitted to define a smooth seal coat. The completed shell is racked to dry or given a final dip in the colloidal silica binder pre-wet and then racked to dry.

Drying

The quick-set shell process has a pronounced effect on shell drying requirements since the slurry coats are chemically gel set and do not require air dry between coats. The completed wet shell contains approximately 15-18% water, but develops adequate strength to allow successful autoclave dewaxing at 8-12 hours, at which point total water content is 8-12%. A shell water balance study indicates that the total water needed to be removed by air drying is lowered by up to 60% through the use of the quick-set process of this invention. This advantage permits both the minimum drying between coats as well as the abbreviated final drying. This dramatic reduction in evaporated water can have a major effect on reducing air conditioning and dehumidification costs. Control of humidity to enhance drying is not a critical factor in quick-set shell construction, but does remain a need for the colloidal silica prime coats, if used.

Dewaxing

A. Steam autoclave. The quick-set shell can tolerate a wide range of autoclave performance provided that unit can deliver a dewaxed shell which is reasonably dry to touch when removed from the autoclave. Satisfactory operating conditions are:

1. Operation at as high a steam pressure as possible, 60 psi or higher, (80-90 psi is typical).
2. Close and pressurize as rapidly as possible, about 15 to 20 seconds or less.
3. Steaming time held to a minimum—about 10 to 15 minutes.
4. Depressurize slowly—about 30 to 60 seconds.
5. Be capable of producing a dewaxed shell which is dry to the touch.

The partially dry quick-set coats are subject to rehydration and strength loss if exposed to a prolonged or low pressure steam autoclave cycle. The quick-set coats rapidly regain strength as moisture vapor leaves the shell after removal from the autoclave and the cooled shell exhibits the highest level of green strength.

B. Gas Fired Furnace. Flash dewaxing is carried out by plunging the air dried shell mold in a furnace heated to 1000°-1900° F. At this temperature the wax surface next to the shell wall rapidly melts so that the pressure due to wax expansion does not crack the shell. The shell mold is then removed to a cooler temperature zone 200° to 600° to complete the wax removal. The melted wax drains through a bottom opening in the melting chamber into a water bath for recovery. Quick-set shells are well suited for furnace dewaxing due to early high green strength development and high shell permeability to relieve wax pressure during the heating cycle.

Furnacing

Furnacing is a final important process step before metal casting which comprises heating the dewaxed shell mold at a temperature of 1600° to 2000° F. to remove volatile residues and stabilize the shell mold by forming ceramic bonds by sintering. In this process step the highly permeable laminar back-up coating layers consolidate around the dense innermost prime coat layers to provide the support needed to withstand the thermal shock and mechanical stress of metal casting. In the quick-set shell construction, the air dried prime coats are 20-30% more dense than the quick-set chemically gelled back-up coats and provide a faithful reproduction of the wax pattern. The low density back-up coating layers provide the shell mold a desirable high level of permeability to release pressures during metal casting. Steel castings weighing more than 150 pounds have been successfully cast at temperatures of 3000° F. in quick-set shell molds having less than 5/16 inch wall thickness.

The shell mold is held in the furnace to attain thermal equilibrium after which it is retrieved from the furnace and cast with the desired molten metal.

EXAMPLES

The following examples are provided to further illustrate the refractory slurry formulations, construction detail and shell mold performance typical of the process of this invention. Percentages and parts are by weight.

EXAMPLE 2

A low expansion, low density shell mold suitable for precision investment casting of ferrous and non-ferrous metals is prepared according to Type A-1 slurry formulations in the following manner.

| Slurry Materials | SHELL MOLD TYPE A-1 | | |
|---|---|---|---|
| | Colloidal Prime | Bluonic Back-Up | Redonic Back-Up |
| Colloidal Binder[2] | 30 | | |
| Bluonic Binder[3] | | 65 | |
| Redonic Binder[4] | | | 80 |
| Fused Silica 120M | 100 | 70 | 70 |
| Alumina Silicate 200M | | 15 | 15 |
| Zircon 325 mesh | | 15 | 15 |
| TOTAL Refractory | 100 | | |
| $R_w$ Binder/Refractory | .30 | .65 | .80 |
| Viscosity - Zahn | 30 sec. No. 5 | 8-12 sec. No. 4 | 8-12 sec. No. 4 |
| Density - grams/cc | 1.92 | 1.76 | 1.75 |

[2]Colloidal binder - alkali stabilized colloidal silica particle size 7-8 nano meters, mole ratio 50 $SiO_2$:1$Na_2O$, Total $SiO_2$ 22%.
[3]Bluonic binder - acid stabilized phosphate modified aluminum salt, mole ratio 1 $P_2O_5$:6$Al_2O_3$, 6HCl and total oxide 15%. (Prepared from aluminum chlorohydrol Al$(OH)_5$Cl.)
[4]Redonic binder - alkali stabilized ionic silicate, mole ratio 3.25 $SiO_2$:1$Na_2O$, Total oxide 27%.

The colloidal silica prime slurry is prepared by mixing 200 mesh fused silica refractory grain with alkali stabilized colloidal silica binder pre-diluted with water to 22% $SiO_2$. Two quick-set back-up slurries are prepared by mixing 120 mesh fused silica, 200 mesh alumina silicate and 325 mesh ziron refractory grain as outlined above with acid stabilized phosphate modified aluminum salt to define a Bluonic slurry and with stabilized ionic silicate to define a Redonic slurry.

A wax pattern is cleaned in a Freon solvent bath and then dipped into the colloidal silica prime slurry, drained thoroughly, stuccoed with 50 mesh fused silica grain and thoroughly air dried (about 1 to 1½ hours) to define a first insoluble gel bonded prime coating as outlined in Type A-1 shell mold construction.

| | SHELL MOLD TYPE A-1 | | | | | | | |
|---|---|---|---|---|---|---|---|---|
| Coating No. | 1 | 2 | 3 | 4 | 5 | 6 | 7 | 8 |
| Pre Wet/ Seal Dip | — | Col | Col | — | — | — | — | Col |
| Drain | — | Drain | Drain | — | — | — | — | Drain |
| Slurry Dip | Col | Col | Blue | Red | Blue | Red | Blue | — |
| Drain | Drain | Drain | Drain | Drain | Drain | Drain | Drain | — |
| Stucco | FS-50 | FS-50 | FS-30 | FS-30 | FS-30 | FS-30 | — | — |
| Hold/Dry | Dry | Dry | Hold | Hold | Hold | Hold | Hold | Dry |

The prime coated shell is pre-wetted by dipping into a bath of colloidal silica binder, and redipped into the prime slurry to apply a second prime coating that is stuccoed and air dried about 2 to 3½ hours to define a second insoluble gel bonded prime coating.

The prime coated shell is again pre-wetted by dipping into a bath of colloidal silica binder, drained and then dipped into the Bluonic slurry and drained to define the first alternating quick-set back-up coating. The shell is stuccoed by dipping into a fluid bed of 30 mesh fused silica grain to define a stucco coating and then dipped into the Redonic slurry to define the second alternating slurry coating. Five alternating back-up slurry coats interspaced by dry stucco coats are applied at about 3 to 5 minute intervals to complete the shell. The final Bluonic slurry coat is not stuccoed so as to define a smooth coating that is gel set by dipping into the colloidal silica binder, drained and racked for final air drying.

After about 8 to 12 hours air drying, the shell mold is dewaxed in a steam autoclave or muffle furnace to remove the disposable wax pattern. The dewaxed shell mold is cooled to room temperature and inspected for cracks and visible defects.

The dewaxed shell mold is then placed in a furnace preheated to 1850° F. and furnaced for about ¾ to 1½ hours. The shell mold is retrieved from the furnace and cast with 17-4 stainless steel at 2950° F. to give a sound casting of excellent surface finish and full compliance with dimensional specifications.

EXAMPLE 3

A shell mold is prepared as in Example 2 except that the Bluonic binder composition is acid stabilized phosphate modified aluminum salt, mole ratio $1P_2O_5:6Al_2O_3$, 36 HCl and total oxide 12% (prepared from aluminum chloride $AlCl_3$). This reflects the use of low cost commercially available aluminum chloride 32° Be solution as the source of soluble aluminum salt and a lower binder solids concentration to favor lower cost.

The autoclave dewaxed and furnaced shell mold is free of cracks and other defects. A shell mold was cast with 17-4 stainless steel at 2950° F. and gave a sound casting of excellent surface finish and full compliance with dimensional specifications.

EXAMPLE 4

A shell mold is prepared as in Example 2 except that the Bluonic binder composition is acid stabilized phosphate modified aluminum salt, mole ratio $1P_2O_5:6Al_2O_3$, $18H_2SO_4$ and total oxide $P_2O_5+Al_2O_3$ of 12%. This reflects the use of low cost commercially available salt and a lower binder solids concentration to favor lower costs. The autoclave dewaxed and furnaced shell mold is free of cracks and other defects and is suitable for metal casting.

EXAMPLE 5

A shell mold is prepared as in Example 2 except that the Bluonic binder composition is acid stabilized phosphate modified aluminum salt, mole ratio $1P_2O_5:2Al_2O_3$, $8H(O_2CH)_2$ and total oxide 12.4% (prepared from aluminum hydroxy formate $Al(OH)(O_2CH)_2$). This reflects the use of a commerically available organic aluminum salt, a less refractory lower mole ratio of alumina to phosphorous pentoxide and a lower binder oxide concentration.

The autoclave dewaxed and furnaced shell mold is free of cracks and other defects and is suitable for metal casting.

EXAMPLE 6

A shell mold is prepared as in Example 2 except that the Redonic binder composition is alkali stabilized ionic silicate, mole ratio $4SiO_2:1K_2O$ and total oxide $SiO_2+K_2O$ of 29%. This reflects the use of commercially available potassium silicate solution such as Kasel #1 Philadelphia Quartz Co. and No. 30 grade DuPont Co.

The autoclave dewaxed and furnaced shell mold is free of cracks and other defects and suitable for metal casting.

EXAMPLE 7

A shell mold is prepared as in Example 2 except that the Redonic binder composition used for quick-set back-up coatings is alkali stabilized colloidal silica, particle size 13–14 nano meters, mole ratio $96SiO_2:1Na_2O$ and total $SiO_2$ 40%. This reflects the use of high solids 40% colloidal silica sol to maximize the chemically gel set bond.

The autoclave dewaxed and furnaced shell mold is free of cracks and other defects and suitable for metal casting.

EXAMPLE 8

A high expansion, medium density shell mold suitable for the precision investment casting of metals that require superior surface detail and easy shell removal is prepared according to type D slurry formulation in the following manner.

| SHELL MOLD TYPE: D | | | |
|---|---|---|---|
| Slurry Materials | Colloidal Prime | Bluonic Back-Up | Redonic Back-Up |
| Colloidal Binder[5] | 30 | | |
| Bluonic Binder[6] | | 60 | |
| Redonic Binder[7] | | | 75 |
| Alumina Silicate 200 | | 10 | 10 |
| Quartz 325 | 100 | 90 | 90 |
| TOTAL Refractory | 100 | 100 | 100 |
| $R_w$ Binder/Refractory | .30 | .60 | .75 |
| Viscosity - Zahn | 20–30 sec. No. 5 | 8–12 sec. No. 4 | 8–12 sec. No. 4 |
| Density - grams/cc | 2.07 | 1.85 | 1.83 |
| STUCCO TYPE | Quartz 70 mesh | Quartz 30 mesh | Quartz 30 mesh |

[5]Colloidal binder - alkali stabilized colloidal silica, particle size 22-25 nano meters, mole ratio 230 $SiO_2:1Na_2O$, Total $SiO_2$ 30%.
[6]Bluonic binder - acid stabilized phosphate modified aluminum salt, mole ratio $1P_2O_5:6Al_2O_3$, 6HCl - 36HCl; and total oxide 12-15%.
[7]Redonic binder - alkali stabilized ionic silicate, mole ratio 3.25 $SiO_2:1Na_2O$, total oxide 27%.

This low fluxing crystalline silica slurry is prepared by mixing 325 mesh Quartz refractory grain with a low sodium alkali stabilized colloidal silica pre-diluted with water to 30% $SiO_2$. Two quick-set back-up slurries are prepared by dispersing 90 parts of Quartz stabilized with 10 parts of alumina silicate refractory grain in Bluonic and Redonic binder solutions as outlined above.

A pre-cleaned wax pattern is coated with refractory materials to define a laminar shell mold according to Type D-1 shell mold construction.

| SHELL MOLD TYPE D-1 | | | | | | | | |
|---|---|---|---|---|---|---|---|---|
| Coating No. | 1 | 2 | 3 | 4 | 5 | 6 | 7 | 8 |
| Pre Wet/ Seal Dip | — | Col | Col | — | — | | | Col |
| Drain | — | Drain | Drain | — | — | | | Drain |
| Slurry Dip | Col | Col | Blue | Red | Blue | Red | Blue | — |
| Drain | Drain | Drain | Drain | Drain | Drain | Drain | Drain | — |
| Stucco | Q-70 | Q-70 | Q-30 | Q-30 | Q-30 | Q-30 | — | — |

-continued

| SHELL MOLD TYPE D-1 | | | | | | | | |
|---|---|---|---|---|---|---|---|---|
| Coating No. | 1 | 2 | 3 | 4 | 5 | 6 | 7 | 8 |
| Hold/Dry | Dry | Dry | Hold | Hold | Hold | Hold | Hold | Dry |

After 8-12 hours final air drying the shell mold is dewaxed in a steam autoclave to remove the disposable wax pattern. The dewaxed shell mold is then placed in a furnace cooled to 500° F. or lower. The temperature is carefully raised to 1100° F. by heating at a rate not to exceed 200° F. per hour so as to permit the shell to stabilize through the change from alpha to beta quartz. The temperature can then be raised rapidly to usual furnacing temperatures of about 1850° F. The shell mold is retrieved from the furnace and cast with stainless steel at 2900°-3000° F., to give a sound casting of excellent surface finish and casting detail and full compliance with dimensional specifications.

EXAMPLE 9

A medium density, high refractoriness, medium expansion shell mold suitable for the precision investment casting of metals that require a low level of metal reactivity is prepared according to Type E slurry formulation in the following manner.

| SHELL MOLD TYPE: E | | | |
|---|---|---|---|
| Slurry Materials | Bluonic Prime | Bluonic Back-Up | Redonic Back-Up |
| Colloidal Binder[8] | | | |
| Bluonic Binder[9] | 30 | 45 | |
| Redonic Binder[10] | | | 60 |
| Alumina Silicate 200 | | | |
| Zircon 325 | | | |
| Alumina 325 | 100 | 100 | 100 |
| TOTAL Refractory | 100 | 100 | 100 |
| $R_w$ Binder/Refractory | .30 | .45 | .60 |
| Viscosity - Zahn | 15 sec. No. 5 | 8-12 sec. No. 4 | 8-12 sec. No. 4 |
| Density - grams/cc | 2.51 | 2.29 | 2.13 |
| STUCCO TYPE | Tab Alumina 50 Mesh | Tab Alumina 30 Mesh | Tab Alumina 30 Mesh |

[8]Colloidal binder - alkali stabilized colloidal silica, particle size 7-8 nano meters, mole ratio 50 $SiO_2$:$1Na_2O$, Total $SiO_2$ 22%.
[9]Bluonic binder - acid stabilized phosphate modified aluminum salt, mole ratio $1P_2O_5$:$6Al_2O_3$, 6HCl - 36HCl; and total oxide 12-15%.
[10]Redonic binder - alkali stabilized ionic silicate, mole ratio 3.25 $SiO_2$:$1Na_2O$, total oxide 27%.

The Bluonic prime slurry is prepared by mixing 325 mesh tabular alumina refractory grain with Bluonic binder to obtain a viscosity of about 15 seconds No. 4 Zahn. Two quick-set back-up slurries are also prepared by mixing 325 mesh tabular alumina refractory grain with Bluonic and Redonic binders to a viscosity range of 8-12 seconds No. 4 Zahn as outlined above.

A wax pattern is cleaned in a Freon solvent bath and then dipped into the Bluonic prime slurry, drained thoroughly, stuccoed with 50 mesh tabular alumina refractory grain and thoroughly air dried (1 to 1½ hours) to define a high alumina gel bonded prime coating as outlined in Type E-1 construction.

| SHELL MOLD TYPE E-1 | | | | | | | | |
|---|---|---|---|---|---|---|---|---|
| Coating No. | 1 | 2 | 3 | 4 | 5 | 6 | 7 | 8 |
| Pre Wet/ Seal Dip | — | Col | — | — | — | — | — | Col |
| Drain | — | Drain | — | — | — | — | — | Drain |
| Slurry Dip | Blue | Red | Blue | Red | Blue | Red | Blue | — |
| Drain | Drain | Drain | Drain | Drain | Drain | Drain | Drain | — |
| Stucco | TAl-50 | TAl-50 | TAl-30 | TAl-30 | TAl-30 | TAl-30 | — | — |
| Hold/Dry | Dry | Hold | Hold | Hold | Hold | Hold | Hold | Dry |

This shell mold construction produces a high alumina prime coat that does not contain silica and has a low reactivity with most molten metals.

After 8-12 hours final air drying the shell mold is dewaxed in a steam autoclave or muffle furnace to remove the disposable wax pattern. The dewaxed shell mold is cooled to room temperature and inspected for cracks and other defects.

The dewaxed shell mold is then placed in a furnace heated to 1850° F. for about ¾ to 1½ hours to remove volatile contaminants and form stable ceramic bonds prior to casting with molten metal. The dewaxed and furnaced shell mold is free of cracks and other defects and is suitable for metal casting.

EXAMPLE 10

A shell mold is prepared as in Example 8 except that the wet, stuccoed Bluonic prime coating is dipped into a Redonic back-up slurry to gel set the wet prime coating and initiate the alternating application of back-up coatings according to Type E-2 shell mold construction.

| SHELL MOLD TYPE E-2 | | | | | | | | |
|---|---|---|---|---|---|---|---|---|
| Coating No. | 1 | 2 | 3 | 4 | 5 | 6 | 7 | 8 |
| Pre Wet/ Seal Coat | — | — | — | — | — | — | — | Col |
| Drain | — | — | — | — | — | — | — | Drain |
| Slurry Dip | Blue | Red | Blue | Red | Blue | Red | Blue | — |
| Drain | Drain | Drain | Drain | Drain | Drain | Drain | Drain | — |
| Stucco | TAl-50 | TAl-50 | TAl-30 | TAl-30 | TAl-30 | TAl-30 | — | — |
| Hold/Dry | Hold | Hold | Hold | Hold | Hold | Hold | Hold | Dry |

This shell mold construction produces a high alumina prime coat shell mold similar to Example 8 but somewhat lower in surface density due to elimination of the air dried prime coating. The shell, however, can be produced more rapidly since there is not time lost to air drying.

The shell is successfully dewaxed after 8-12 hours final air drying by steam autoclaving or furnace dewaxing to remove the disposable wax pattern. The dewaxed and furnaced shell mold is free of cracks and other visible defects and is suitable for metal casting.

The above description relates to a preferred embodiment of the invention. However, alternative configurations and modifications are possible within the scope of the invention. Therefore, the subject matter of the invention is to be limited only by the following claims and their equivalents.

What is claimed is:

1. A solution for use in making a laminar ceramic shell mold for investment casting, comprising in combination:
   (a) water, and
   (b) an acid stabilized phosphate modified positively charged aluminum salt.

2. The solution of claim 1 wherein the acid stabilized phosphate modified positively charged aluminum salt is formed by the reaction between a water soluble aluminum salt in an acidic medium and phosphoric acid.

3. The solution of claim 2 wherein the acidic medium is formed by the addition of a water soluble aluminum salt containing an acid anion to water.

4. The solution of claim 3 wherein the acid anion is selected from the group consisting of chloride, sulfate, nitrate, acetate and formate.

5. The solution of claim 2 wherein the water soluble aluminum salt is selected from the group consisting of aluminum chloride and aluminum chlorohydrol.

6. The solution of claim 2 wherein the molar ratio of alumina to hydrogen from the acid anion is between 1:1 and about 1:6.

7. The solution of claim 1 wherein the molar ratio of phosphorous pentoxide to alumina in the acid stabilized phosphate modified aluminum salt comprises between about 1:2 and about 1:9.

8. The solution of claim 1 wherein the acid stabilized phosphate modified positively charged aluminum salt contains alumina and phosphorous pentoxide, and the oxides collectively comprise between about 10 and about 22 percent by weight of the solution.

9. The solution of claim 1 further comprising a particulate refractory material.

10. The solution of claim 9 wherein the refractory material comprises one or more materials selected from the group consisting of kyanite, mullite, calcined china clay, aluminosilicate, vitreous and crystalline silica, zircon, and chromite ore.

11. The solution of claim 10 wherein the solution has a pH of less than about 4.0.

12. The solution of claim 11 wherein the solution has a specific gravity of between about 1.12 and 1.31.

13. The solution of claim 11 wherein the solution has a viscosity between about 3 and about 12 c.p.s. at 25° C.

* * * * *